July 5, 1949.  J. H. CANTLIN  2,474,826
QUICK DUMPING VALVE
Filed June 7, 1944
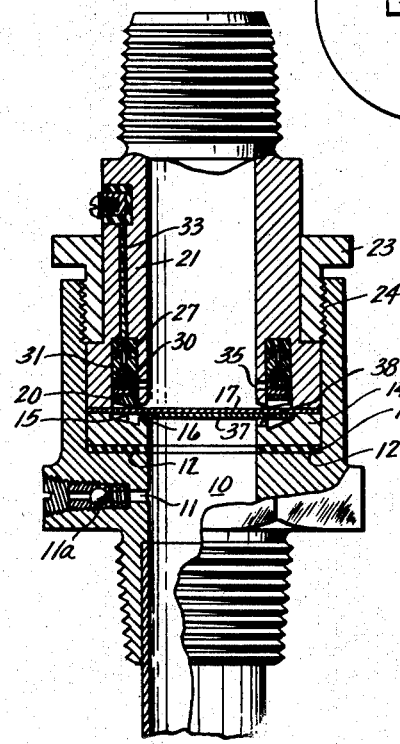
FIG. 1
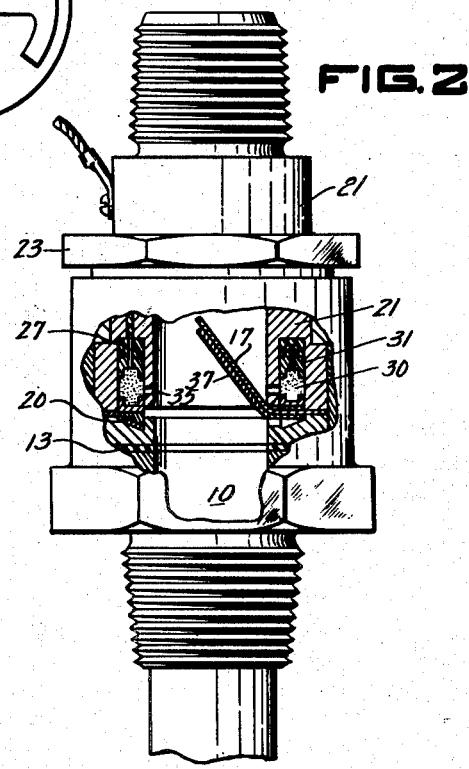
FIG. 3
FIG. 2
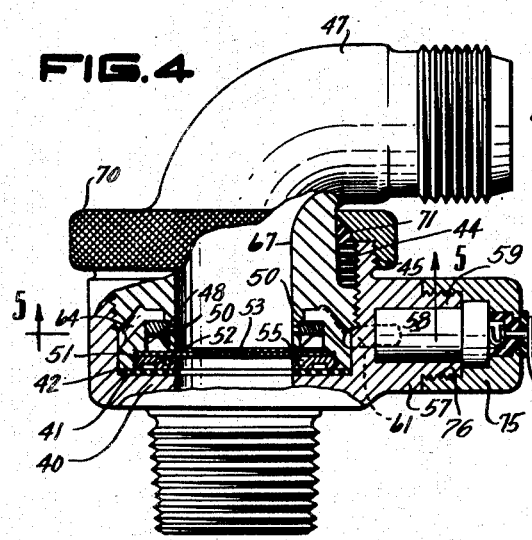
FIG. 4
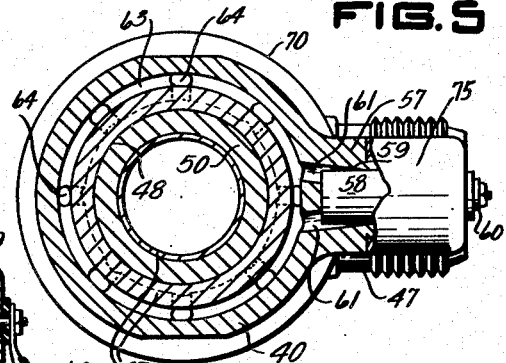
FIG. 5
INVENTOR
JOHN H. CANTLIN
BY
ATTORNEYS Patented July 5, 1949

2,474,826

UNITED STATES PATENT OFFICE 2,474,826

QUICK DUMPING VALVE

John H. Cantlin, Auburn, Maine

Application June 7, 1944, Serial No. 539,166

6 Claims. (Cl. 220—47)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to valves and more particularly to a quick dumping valve for use in high pressure fire extinguishers or the like.

In fires involving gasoline, and particularly as applied to aircraft, it is necessary to discharge a large quantity of extinguisher fluid in a very short period of time in order that the fire may be effectively smothered. The usual amount of fluid discharged ranges from five to ten pounds in a period of one to two seconds. In order to accomplish this very high rate of flow, it is essential that the valve offers the minimum resistance to the flow when open, while maintaining an absolutely tight seal prior to dumping.

One object of the invention is to provide a valve which when closed, will provide an effective seal to the flow of fluids, and which will offer a minimum resistance to the flow of the fluid when open.

Another object of the invention is to provide a valve in which the danger of clogging the passage during operation is reduced to a minimum.

Still another object is to provide a valve which will permit refilling of the fluid container without disturbing the valve seating.

Still another object of the invention is to provide a valve which will permit the container to be recharged without the use of special equipment.

A further object of the invention is to provide a valve which can be economically manufactured and which will be positive and rapid in its action.

A still further object is to provide a valve which can be opened rapidly from a point remote therefrom.

Other objects will become apparent upon considering the following specification which, when taken in conjunction with the accompanying drawing, discloses preferred forms of the invention.

In the drawings:

Fig. 1 is a vertical cross-section of a discharge valve for fire extinguishers or the like involving the present invention;

Fig. 2 is an elevational view partly in cross-section of the valve shown in Fig. 1;

Fig. 3 is a plan view of the valve disk;

Fig. 4 is an elevational view partly in cross-section showing a modification of the invention and the form thereof which is at present preferred by me; and Fig. 5 is a cross-section on the line 5—5 of Fig. 4, looking in the direction of the arrows.

Referring to Figs. 1 and 2, the valve shown has a valve chamber 10 with a valved aperture 11 passing through the wall thereof, through which fluid under pressure may be supplied to the fluid container (not shown). The valve 11a in the opening 11 may be of the ball type and spring loaded to prevent escape of pressure from the container.

The valve chamber 10 contains a seat 12 on which is a gasket 13, which is adapted to form a seal between the seat 12 and an anvil 14. The anvil 14 is provided with a well 15 having an annular cylindrical wall 16 which cooperates with an annular shear 20 to cut a valve disk 17, shown separately in Fig. 3. The valve disk 17 is held in position between the anvil 14 and a firing plug 21, the entire periphery of the disk being held clamped between the anvil and the firing plug 21 by means of a ring nut 23. The ring nut 23 has exterior threads receivable in interior threads 24 in the top of the valve chamber wall.

The firing plug 21 has an annular recess 27 therein, the inner lip of which lies slightly above the disk 17, and is of the same inside diameter as the inner periphery of the annular wall 16.

The annular shear 20, which is movably mounted in the recess 27, is actuated by the explosion of a powder charge 30, which is carried in a powder chamber 31 preferably made of plastic material. The powder 30 is ignited by a conventional electric firing mechanism including a lead-in wire 33. Radial ports 35 may be provided around the periphery of the recess 27 which are uncovered after the shear 20 has completed cutting the valve disk, to provide for the escape of the products of combustion.

The valve disk 17 is provided with a substantially T-shaped reinforcement 37 which is fixed to the disk 17 by soldering or other suitable means. The anvil 14 is provided with a non-cutting portion 38 directly over the stem of the T-shaped reinforcment so that when the disk is cut by the shear, the portion across the T-shaped reinforcement will remain uncut, the valve disk then being blown close to the wall of the passage and providing uninterrupted flow to the fluid. The reinforcement 37 insures against the valve disk 17 tearing loose and becoming stuck in the passage to impede the flow of fluid.

Referring now to Figs. 4 and 5, the valve shown therein has a preferred form of valve chamber 40 with an enlarged recess at its upper end, the bottom of which forms a seat 41 for a gasket 42.

The upper end of the recess is threaded interiorly as at 44 with a right hand thread and exteriorly as at 45 with a left hand thread.

The interior threads 44 of the valve chamber receive the exterior threads of a firing plug 47 which screws down onto the gasket 42 to form a fluid tight seal. The firing plug 47 is provided with a recess 48 adjacent the lower end, which houses an annular shear ring 50, similar to the ring 20 shown in Figs. 1 and 2. The lower end of the recess 48 is enlarged and threaded as at 51 to receive an anvil 52. The anvil 52 engages in screw threads in the enlarged portion 51 of the recess 48 and clamps a valve disk 53 between itself and an annular shoulder in the recess 48. The valve disk 53 is identical to the disk 17—37 shown in Figs. 1 and 3.

The anvil 52 has a recess 55 therein which accommodates the cutting edge of the shear ring 50, so that as the ring 50 moves downwardly the valve disk 53 is sheared between the ring 50 and the recess 55 in the anvil 52.

The valve chamber 40 has a boss 57 formed on one side thereof, the boss having a recess 59 of sufficient diameter and length to accommodate a standard size blank cartridge 58 containing an explosive charge. Electrical means 60 are provided to explode the cartridge upon completion of an electric circuit. The expanding gases from the burning explosive pass into apertures 61—61 in the valve chamber, and from these into an annular aperture 63 in the firing plug 47 and through recesses 64 and into the recess 48 above the shear ring 50. The gas pressure above the ring 50 forces the shear ring 50 down and shears the valve disk 53 around the major portion of its periphery. Shearing the disk 53 permits pressure from the fluid container to blow the disk upwardly against the side of the fluid passage 67 and permits uninterrupted discharge of the fluid.

The external left hand thread 45 on valve chamber 40 receives a ring nut 70, surrounding the firing plug 47. A triangular annular packing ring 71 is interposed between the nut 70 and the firing plug 47 so that when the firing plug 47 is backed up to the upper limit of the threads 44 the packing ring 71 will insure a tight seal between the nut 70 and the firing plug 47.

Operation

In the form of the invention shown in Figs. 1 and 2, the valve disk 17 is clamped in place between the firing plug 21 and the anvil 14 and the valve screwed into position on the container (not shown) through the screw thread provided on the valve.

The container is then charged through the valved opening 11, and the complete assembly placed in position for use, with the electric circuit connected through the wire 33.

When it is desired to open the valve to discharge the fluid in the container, the electric circuit is completed through the wire 33 exploding the powder, forcing the shear 20 downwardly and cutting the valve disk 17 around the periphery thereof except across the leg of the T-shaped reinforcement 37.

Pressure from the fluid container blows the valve disk upwardly against the side wall of the valve passage permitting free and very rapid escape of the extinguisher fluid, thereby to smother the fire.

In the form of the invention shown in Figs. 4 and 5, the valve disk 53 is clamped between the anvil 52 and the shoulder on the firing plug 47, and the firing plug is screwed into place in the valve chamber 40.

The ring nut 70 with the packing 71 is then screwed tight on the valve chamber 40 and the firing plug 47 backed off its seat until it is firmly in engagement with the packing 71. At this point the bottom of the firing plug is above the ports 61. The cap 75 is then unscrewed from the boss 57, the cartridge 58 removed and the fluid container charged by connecting a reserve fluid cylinder (not shown) to the threads 76 on the end of the boss 57. Fluid will then flow from the reserve container through the apertures 61 and into the fluid container which is controlled by the valve disk 53.

When the fluid container is fully charged, the firing plug 47 is screwed down until it seats on the gasket 42. The reserve cylinder may then be detached from the boss 57, the cartridge 58 reinserted and the electrical connection completed.

When the cartridge 58 is fired, the expanding gases exert pressure on the top of the shear ring 50 through the ports 61, 63, 64, and the chamber 48, thus forcing the shear ring 50 downwardly, cutting the disk around its periphery except across the stem of the reinforcement 37. The disk is then blown against the side wall 67 by the pressure of the fluid in the fluid container, giving a practically unobstructed passage to the flow of fluid.

It is to be understood that the forms of the invention herein shown and described are to be taken as preferred examples of the same and that various changes in the shape, size, and arrangement of parts may be resorted to without departing from the spirit of the invention or the scope of the appended claims.

What is claimed as new and desired to secure by Letters Patent is:

1. A quick dumping valve adapted to be secured to a fluid container comprising, in combination, a valve body consisting of two principal parts, one being partly received within the other, and means to secure the parts together; both parts having a passageway entirely through the valve body; an imperforate, rupturable valve disk lying athwart said passageway; an anvil within the valve body means clamping the valve disk adjacent the anvil so as to close and seal said passageway, said clamping means surrounding and being entirely outside of the passageway but within the valve body; a shear member adapted to cooperate with said anvil and also surrounding the passageway and likewise being entirely outside thereof but within the valve body, in which it is movable axially of the passageway; and means including an explosive charge for actuating the shear member to rupture the valve disk.

2. The invention as set forth in claim 1, wherein the passageway is of uniform diameter clear through the valve body; the valve disk having a non-rupturable substantially T-shaped reinforcement thereon to anchor it at one point on its periphery to the clamping means, so that the valve disk may be flattened by fluid pressure against the inside of the passageway and will not be blown into a fluid-obstructing position.

3. A quick dumping valve adapted to be secured to a fluid container comprising, in combination, a valve body having a passage therethrough and consisting of two parts one of which has threaded connection within the other, said one part providing a chamber and the other part providing a support; an anvil on said support adjacent said chamber; an imperforate, rupturable valve disk; means to clamp the valve disk within the valve body adjacent the anvil and in position to prevent any flow of fluid through said passage; a shear movably mounted in said chamber for cooperation with said anvil; an explosive charge mounted on the valve body; means to detonate the explosive charge; ports in the valve body to conduct at least part of the products of combustion of the explosive charge to one surface of the shear to move it toward the anvil and cut the valve disk through the major portion of the periphery thereof to open the passage in the valve body; a nut and packing carried by the said one part to provide a seal outside of the threaded connection thereof with said other part, irrespective of the position of said one part within the other, so that fluid under pressure may not escape at the connection; a boss on the said other part having a chamber for the explosive charge; a cap threaded on the boss and being removable to permit renewal of the charge or removal thereof to provide for connection of a fluid pressure container to the boss; the said one part being arranged and adapted to be backed off sufficiently to engage said packing and clear said ports and allow fluid to flow through the chamber in the boss into the passage in the valve body and thence to the fluid container to which the valve body is secured, so that said fluid container may be charged by the fluid pressure container through the valve member without removing the valve disk.

4. A valve body consisting of two principal parts, one being partly received within the other and both parts having a passageway entirely through the valve body, means to secure the said parts together, an anvil within the valve body, a ring like shear member within the wall of the valve body and surrounding said passageway but being entirely outside thereof, said shear member being cooperatively positioned with respect to the anvil and being movable axially of the passageway, an imperforate rupturable valve disk lying athwart said passageway between the anvil and the shear member and having its marginal portion clamped between the anvil and a surface portion of one of the principal parts so as to close and seal the passageway, and means including an explosive charge for actuating the shear member to rupture the valve disk.

5. The structure defined in claim 4 wherein the "means including an explosive charge" is in the form of a frangible hollow annulus movable axially in the opening in the wall of the valve body adjacent said ring like shear member, the hollow of said annulus containing the explosive.

6. A valve body consisting of upper and lower axially aligned body parts, the upper being partly received within the lower and both having coaxial passageways of the same diameter extending entirely through the two said parts, means to secure the parts together, an annular anvil coaxially held in the valve body between the two said body parts, an annular recess coaxially formed in the underside of the upper body part, the inner diameter of the recess being somewhat larger than and surrounding the coaxial passageways, an annular shear member slidable in said recess in axial alignment with said annular anvil, an imperforate rupturable valve disk clamped between the upper body part and the anvil and obstructing said passageways, and a hollow frangible ring including an explosive charge freely fitted to said recess above said shear member.

JOHN H. CANTLIN.

REFERENCES CITED

The following references are of record in the file of this patent:

UNITED STATES PATENTS

| Number | Name | Date |
|---|---|---|
| 824,934 | Jenczewsky | July 3, 1906 |
| 1,882,700 | Allen et al. | Oct. 18, 1932 |
| 1,914,250 | Gillen | June 13, 1933 |
| 1,933,694 | Allen et al. | Nov. 7, 1933 |
| 1,951,897 | Binckley | Mar. 20, 1934 |
| 1,954,285 | Denk et al. | Apr. 10, 1934 |
| 1,974,254 | Allen et al. | Sept. 18, 1934 |
| 1,984,510 | Allen et al. | Dec. 18, 1934 |
| 2,047,049 | Allen | July 7, 1936 |
| 2,095,828 | Nerad | Oct. 12, 1937 |
| 2,262,925 | Cole | Nov. 18, 1941 |
| 2,276,830 | Doran | Mar. 17, 1942 |
| 2,301,365 | Bushnell | Nov. 10, 1942 |
| 2,304,417 | Mason | Dec. 8, 1942 |

FOREIGN PATENTS

| Number | Country | Date |
|---|---|---|
| 435,219 | Germany | Oct. 11, 1926 |